US006989432B2

(12) United States Patent
Pruckmayr et al.

(10) Patent No.: US 6,989,432 B2
(45) Date of Patent: Jan. 24, 2006

(54) COPOLYMERS OF TETRAHYDROFURAN, ETHYLENE OXIDE AND AN ADDITIONAL CYCLIC ETHER

(75) Inventors: Gerfried Pruckmayr, Media, PA (US); Charles Francis Palmer, Jr., Waynesboro, VA (US); Gary Arthur Lodoen, Waynesboro, VA (US)

(73) Assignee: Invista North America S.a.r.l., Wilmington, DE (US)

( * ) Notice: Subject to any disclaimer, the term of this patent is extended or adjusted under 35 U.S.C. 154(b) by 50 days.

(21) Appl. No.: 10/338,396

(22) Filed: Jan. 8, 2003

(65) Prior Publication Data

US 2003/0166821 A1 Sep. 4, 2003

Related U.S. Application Data

(60) Provisional application No. 60/347,385, filed on Jan. 10, 2002.

(51) Int. Cl.
*C08G 65/20* (2006.01)
*C08G 65/08* (2006.01)
*C07C 43/04* (2006.01)

(52) U.S. Cl. .............. 528/417; 568/614; 568/615; 568/617

(58) Field of Classification Search ............ 568/614, 568/615, 617; 528/417
See application file for complete search history.

(56) References Cited

U.S. PATENT DOCUMENTS

| 3,636,132 | A | | 1/1972 | Saegusa et al. |
| 4,139,567 | A | | 2/1979 | Pruckmayr |
| 4,153,786 | A | | 5/1979 | Pruckmayr |
| 4,163,115 | A | | 7/1979 | Heinsohn et al. |
| 4,211,854 | A | | 7/1980 | Robinson |
| 4,568,775 | A | * | 2/1986 | Aoshima et al. ............ 568/617 |
| 4,658,065 | A | | 4/1987 | Aoshima et al. |
| 5,684,179 | A | | 11/1997 | Dorai |
| 6,355,846 | B1 | * | 3/2002 | Dorai et al. ................ 568/617 |

FOREIGN PATENT DOCUMENTS

| GB | 834158 | 5/1960 |
| WO | WO 97/21756 A1 | 6/1997 |

OTHER PUBLICATIONS

P. Dreyfuss, Copolymerization, Poly(Tetrahydrofuran), 1982, pp. 62-69, 8, Gordon and Breach Science Publishers.

* cited by examiner

*Primary Examiner*—Rabon Sergent

(74) *Attorney, Agent, or Firm*—Charles E. Krukiel

(57) ABSTRACT

A copolymer with recurring constituent units derived by polymerizing tetrahydrofuran, ethylene oxide and at least one additional cyclic ether that can be substituted or unsubstituted that decreases the hydrophilicity imparted to the copolymer by the ethylene oxide.

8 Claims, No Drawings

COPOLYMERS OF TETRAHYDROFURAN, ETHYLENE OXIDE AND AN ADDITIONAL CYCLIC ETHER

BACKGROUND OF THE INVENTION

1. Field of the Invention

This invention relates to new compositions comprising copolymers of tetrahydrofuran, ethylene oxide, and an additional cyclic ether.

2. Description of the Related Art

Homopolymers of tetrahydrofuran (THF, oxolane), i.e., polytetramethylene ether glycols, are well known for use as soft segments in polyurethanes. These homopolymers impart superior dynamic properties to polyurethane elastomers and fibers. They have very low glass transition temperatures but their crystalline melt temperatures are above room temperature. Thus, they are waxy solids at ambient temperatures and need to be kept at elevated temperatures to prevent solidification.

Copolymerization with a cyclic ether has been used to reduce the crystallinity of the polytetramethylene ether chains. This lowers the polymer melt temperature of the polyglycol and at the same time may improve certain dynamic properties of a polyurethane which contains such a copolymer as a soft segment. Among the comonomers used for this purpose is ethylene oxide, which can lower the copolymer melt temperature to below ambient, depending on the comonomer content. Use of copolymers of THF and ethylene oxide may also increase certain dynamic properties of polyurethanes, for example elongation at break, which for some end uses is desirable.

Copolymers of THF with ethylene oxide are well known in the art. Their preparation is described e.g. by Pruckmayr in U.S. Pat. No. 4,139,567 and U.S. Pat. No. 4,153,786. Such copolymers can be prepared by any of the known methods of cyclic ether polymerization, described for instance in "Polytetrahydrofuran" by P. Dreyfuss (Gordon & Breach, N.Y. 1982). Such polymerization methods include catalysis by strong proton or Lewis acids, by heteropoly acids, as well as by perfluorosulfonic acids or acid resins. In some instances it may be of advantage to use a polymerization promoter, such as a carboxylic acid anhydride, as described in U.S. Pat. No. 4,163,115. In these cases the primary polymer products are diesters, which need to be hydrolyzed in a subsequent step to obtain the desired polymeric glycols.

U.S. Pat. No. 5,684,179 to Dorai (Dorai) discloses the preparation of diesters of polytetramethylene ethers from the polymerization of THF with one or more comonomers. While Dorai includes 3-methyl THF, ethylene oxide, propylene oxide, etc., it does not describe a glycol copolymer of THF, ethylene oxide, and cyclic or substituted cyclic ethers.

Glycols formed as copolymers of THF and ethylene oxide offer advantages over homopolymer glycols in terms of physical properties. At ethylene oxide contents above 20 mole percent, the copolymer glycols are moderately viscous liquids at room temperature and have a lower viscosity than polytetrahydrofuran of the same molecular weight at temperatures above the melting point of polytetrahydrofuran. Certain physical properties of the polyurethanes prepared from THF copolymers surpass the properties of those polyurethanes prepared from THF homopolymers.

However, there are certain disadvantages connected with the use of ethylene oxide (EO) in these copolymers. EO is quite hydrophilic and can increase the water sensitivity of the corresponding polyurethanes when used in the required concentrations.

SUMMARY OF THE INVENTION

The invention is a copolymer glycol prepared by polymerizing tetrahydrofuran, ethylene oxide and at least one additional cyclic ether. The invention is also directed to a polyurethane polymer comprising the reaction product of at least one organic polyisocyanate compound and a copolymer glycol prepared by copolymerizing tetrahydrofuran, ethylene oxide and at least one additional cyclic ether. The invention is also directed to spandex filaments comprising the aforementioned polyurethane.

DETAILED DESCRIPTION OF THE INVENTION

The present invention relates to a glycol composition of matter comprising copolymers of THF, ethylene oxide, and one or more additional cyclic ethers. Herein, the term "copolymer" means a polymer formed from at least three monomers. Because incorporation of ethylene oxide into the polymer glycol increases the hydrophilic character of the subsequent polyurethane product, it is desirable to control or even minimize this hydrophilicity, and thereby decrease the water sensitivity of products ultimately made from these copolymers. The additional cyclic ethers or substituted cyclic ethers are more hydrophobic and offset the increase in hydrophilicity caused by the ethylene oxide comonomer. This serves to decrease the water sensitivity of compounds, such as polyurethanes that are made from the inventive copolymers. Examples of such hydrophobic monomers are alkyl substituted tetrahydrofurans and larger ring cyclic ethers that contain a smaller proportion of oxygen in the molecule than ethylene oxide. A copolymer glycol can be produced, containing tetramethylene oxide and ethylene oxide units in the polymer chain, as well as units of the additional polyether monomer distributed in a random fashion along the polymer backbone chain. It should be noted that alkyl-substituted oxolanes, such as 3-methyloxolane, are referred to as the corresponding alkyl substituted THF, i.e., as 3-methyl-THF in this case. Herein, the term "cyclic ethers" will be understood to include both unsubstituted and substituted forms.

The copolymers of the present invention can be made by the method of Pruckmayr in U.S. Pat. No. 4,139,567 using a solid perfluorosulfonic acid resin catalyst. Alternatively, any other acidic cyclic ether polymerization catalyst may be used to produce these copolymers, e.g., heteropoly acids. The heteropoly acids and their salts useful in the practice of this invention are the catalysts described e.g., by Aoshima, et al. in U.S. Pat. No. 4,658,065 for the polymerization and copolymerization of cyclic ethers.

A wide range of strong acid and superacid catalysts that are well known to those skilled in the art can be used for the copolymerization of cyclic ethers of this invention. These include, but are not limited to, fluorinated sulfonic acids, supported Lewis or Bronsted acids, and various zeolites and heterogeneous acid catalysts. Perfluorinated ion exchange polymers (PFIEP), such as the NAFION® PFIEP products, a family of perfluorinated sulfonic acid polymers are generally suitable for use at EO levls of about 25 mole % or greater. NAFION® is commercially available from E. I. du Pont de Nemours and Company, Wilmington, Del. (hereinafter, DuPont). Fluorosulfonic acids are widely used as catalysts, especially for the lower levels of EO. Heteropoly acids, (phosphotungstic acid, for example) are generally suitable over the range of EO levels used.

The molar concentration of ethylene oxide in the polymer is 1% to 60% and preferably 1% to 30%. The molar concentrations of the additional cyclic ethers is 1% to 40% and preferably 1% to 20%.

The cyclic ethers can be represented by Formula 1:

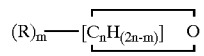

where
R is a C1 to C5 alkyl or substituted alkyl group,
n is an integer of value 3 to 4 or 6 to 9,
m is zero or 1 except that when n=4, m is 1.

Examples of cyclic ethers are as follows:

| Ring C | Chemical Name |
|---|---|
| C3 | oxetane, methyl-oxetane, and dimethyl-oxetanes, |
| C4 | alkyl-tetrahydrofuran such as 3-methyl-THF and 3-ethyl-THF, and 2-methyl-THF, |
| C6 | oxepane, |
| C7 | oxocane, |
| C8 | oxonane, and |
| C9 | oxecane |

Although not represented by the formula above, 3,4-dimethyloxolane (3,4-dimethyl-THF) and perfluoroalkyl oxiranes, e.g., (1H,1H-perfluoropentyl)-oxirane, can be used as an additional cyclic substituted ether for the purposes of this invention.

The mole percent proportions of the monomers in the THF/EO/3-MeTHF copolymer is 3–50% EO, 5–25% of the 3-MeTHF, and the remainder is THF. Preferred mole percent ranges are 8–25% EO, 5–15% 3-MeTHF, and the remainder THF.

During the copolymerization process of this invention, the ethylene oxide acts as a polymerization initiator (or promoter) and copolymerization starts with opening of the strained 3-membered ring, quickly initiating ring opening of the other cyclic ethers of this invention. To the extent that the ethylene oxide, tetrahydrofuran, and a third monomer, such as an alkyl substituted tetrahydrofuran, combine hydrophobic and hydrophilic comonomer units, the deliberate control of composition affords novel polymer chains. These new copolymers are of value as "soft segments" in polyurethane polymers. They are particularly of value when used in making spandex.

"Spandex" means a manufactured fiber in which the fiber-forming substance is a long chain synthetic polymer comprised of at least 85% by weight of a segmented polyurethane. The segmented polyurethane can be made from a polymeric glycol, a diisocyanate, and a difunctional chain extender. In the preparation of the spandex polymers, the polymer is extended by sequential reaction of the hydroxy end groups with diisocyanates and diamines. In each case, the copolymer must undergo chain extension to provide a spinnable polymer with the necessary properties, including viscosity.

Polymeric glycols that can be used in making the polyurethane of the present invention can have a number average molecular weight of approximately 1500–4000. Diisocyanates that can be used include 1-isocyanato-4-[(4-isocyanatophenyl)methyl]benzene, ("4,4'-MDI") 1-isocyanato-2-[(4-cyanatophenyl)methyl]benzene ("2,4'-MDI"), mixtures of 4,4'-MDI and 2,4'-MDI, bis(4-isocyanatocyclohexyl) methane, 5-isocyanato-1-(isocyanatomethyl)-1,3,3-trimethylcyclohexane, 1,3-diisocyanato-4-methyl-benzene, and mixtures thereof. When a polyurethane is desired, the chain extender is a diol, for example ethylene glycol, 1,3-propane diol, or 1,4-butane diol, and mixtures thereof.

Optionally, a monofunctional alcohol chain terminator such as butanol can be used to control polymer molecular weight, and a higher functional alcohol "chain brancher" such as pentaerythritol can be used to control viscosity. Such polyurethanes can be melt-spun, dry-spun, or wet-spun into spandex. When a polyurethaneurea (a sub-class of polyurethanes) is desired, the chain extender is a diamine, for example ethylene diamine, 1,3-butanediamine, 1,4-butanediamine, 1,3-diamino-2,2-dimethylbutane, 1,6-hexanediamine, 1,2-propanediamine, 1,3-propanediamine, N-methylaminobis(3-propylamine), 2-methyl-1,5-pentanediamine, 1,5-diaminopentane, 1,4-cyclohexanediamine, 1,3-diamino-4-methylcyclohexane, 1,3-cyclohexane-diamine, 1,1-methylene-bis(4,4'-diaminohexane), 3-aminomethyl-3, 5,5-trimethylcyclohexane, 1,3-diaminopentane, m-xylylene diamine, and mixtures thereof. Optionally, a chain terminator, for example diethylamine, cyclohexylamine, or n-hexylamine, can be used to control the molecular weight of the polymer, and a trifunctional 'chain brancher' such as diethylenetriamine can be used to control solution viscosity. Polyurethaneureas are typically dry-spun or wet-spun when spandex is desired.

The practice of the present invention is demonstrated by Examples below which are not intended to limit the scope of the invention.

Materials

THF, 2-methyl-THF, fluorosulfonic acid, and phosphotungstic acid hydrate are available from Aldrich Chemical, Milwaukee Wis. The phosphotungstic acid hydrate was dehydrated by heating at 300° C. for at least three hours prior to use.

3-Methyl-THF, 3-ethyl-THF, and oxepane were prepared according to methods described in the literature.

EXAMPLES

Example 1

This example was provided to show copolymerization of THF, 3-ethyl-THF, and ethylene oxide. THF (160 g, 2.22 mols) and 3-ethyl-THF (40 g, 0.4 mols) were added to a 500 ml 4-neck round-bottomed flask, equipped with mechanical stirrer, dry ice condenser, thermometer, and gas inlet tube. 1,4-Butanediol (0.8 g, 0.01 mols) was added as a molecular weight controlling agent, together with 10 g of dry NAFION® NR-50, cryoground to less than 80 mesh. NAFION® NR-50 is a solid perfluorosulfonic acid resin in bead form, available from DuPont. The polymerization mixture was stirred and heated to 50° C. At this point ethylene oxide was added slowly via the gas inlet tube and the addition was continued until 8.3 g (0.19 mols) were added, which took about 4 hours. The EO feed was then shut off and the gas inlet system flushed with dry nitrogen. Heating was continued for another 15 minutes, and the polymerization vessel then cooled to 30° C. before filtration.

The solid catalyst was recovered and could be reused. The polymer solution was vacuum dried at 100° C. at 0.2 mm Hg (0.027 kPa) pressure. A final product filtration gave 50 g (24%) of a clear, viscous polymer, which was characterized by Fourier Transform Infra-Red Spectroscopy (FTIR), Nuclear Magnetic Resonance Spectroscopy (NMR), and Gel Permeation Chromatography (GPC). It had the following properties and composition

| | |
|---|---|
| Number Average Molecular Weight: | 3100 |
| THF content: | 72 mol % |
| EO content: | 25 mol % |
| 3-ethyl-THF content: | 3 mol % |

Example 2

This example was provided to show copolymerization of THF, 3-Ethyl-THF, and ethylene oxide.

A 250-ml round-bottomed polymerization reactor was set up, equipped with a mechanical stirrer, dry ice reflux condenser with Drierite moisture protection tube, thermometer, and gas inlet tube. THF (26 g, 0.36 mol.), 3-ethyl-THF (13 g, 0.13 mol.), and dry NAFION catalyst powder (grade NR-50, 3 g) were added. The mixture was heated to 60° C. with stirring, under a slow stream of nitrogen. When the system had reached 60° C., ethylene oxide gas (EO) was added slowly through the gas inlet tube at a rate of about 6 g/h. EO addition was continued until a total of 6.5 g EO had been added. The EO feed was then shut off, and the gas inlet system flushed with nitrogen. Heating was continued for another 15 minutes, and then the polymerization vessel was allowed to cool to room temperature.

The polymer solution was separated from the solid catalyst by filtration, and any polymer attached to the catalyst was removed by washing with dry methanol. Unreacted monomer was removed from the solution by distillation, and the polymer residue was vacuum dried for 1 hour at 100° C. and 1 mm of Hg (0.13 kPa) pressure. A final filtration gave 36 wt % of a clear polymer with a number average molecular weight determined by end group titration to be 1075, and the following composition as determined by NMR analysis:
49 wt % THF,
20 wt % 3-ethyl-THF, and
31 wt % of EO.

Example 3

This example was provided to show copolymerization of THF, oxepane, and ethylene oxide. A 100-ml round-bottomed polymerization reactor was set up, equipped with mechanical stirrer, dry ice reflux condenser with Drierite moisture protection tube, thermometer, and gas inlet tube. THF(10 g, 0.14 mol.), oxepane (hexamethylene oxide, 10 g, 0.1 mol.), and dry NAFION catalyst powder (grade NR-50, 2 g) were added. 1,4-butanediol was added as a molecular weight controlling agent. The mixture was heated to 70° C. with stirring, under a slow stream of nitrogen. When the system had reached 70° C., ethylene oxide gas was added slowly through the gas inlet tube at a rate of 4.5 g per hour. EO addition was continued until a total of 9 g EO had been added. The EO feed was then shut off, and the gas inlet system flushed with nitrogen. Heating was continued for another 15 minutes, and then the polymerization vessel was allowed to cool to room temperature.

The polymer solution was separated from the solid catalyst by filtration, and any polymer attached to the catalyst was removed by washing with dry methanol. The polymer was isolated from the solution by vacuum drying for 1 hour at 100° C. and 1 mm of Hg (0.13 kPa) pressure. A final filtration gave 45 wt % of a clear polymer with a number average molecular weight determined by end group titration to be 2420, and the following composition as determined by NMR analysis:
45 wt % THF,
20 wt % oxepane, and
35 wt % of EO.

Example 4

This example was provided to show copolymerization of THF, 3-Methyl-THF, and ethylene oxide.

THF (800 g, 11.1 mole) and 3-methyl-THF (100 g, 1.15 mole) were added to a 2-liter 4-neck round-bottom polymerization reactor, equipped with a mechanical stirrer, dry ice condenser, thermometer, and gas inlet tube. 1,4-butanediol (4 g, 0.033 mole) was added as a molecular weight controlling agent, and dry NAFION pellets (grade NR-50, 30 g) added as a polymerization catalyst.

The polymerization mixture was stirred and heated to 50° C., when ethylene oxide was added slowly added via the gas inlet tube. Ethylene oxide addition was continued until 55 g (1.25 mole) had been added over a period of about 4 hours. The ethylene oxide feed was then shut off and the gas inlet system flushed with nitrogen. Heating was continued for another 15 minutes, and then the polymerization vessel was cooled to 35° C. before filtration. The solid catalyst residue was washed and could be recycled. The polymer solution was vacuum dried for 1 hour at 100° C. at 2 mm Hg pressure (0.27 kPa). A final product filtration gave a clear viscous polymer with the following typical properties:

| | |
|---|---|
| $M_n$: | 2700 |
| Viscosity: | 10.5 poise (1.05 Pa · s) at 40° C. |
| Melt temp.: | −3.9° C. |
| EO Content: | 28 mol % |
| 3-methyl-THF Content: | 8 mol % |

Examples 5–15

These examples demonstrated copolymerization of THF, 3-Methyl-THF, and ethylene oxide using fluorosulfonic acid (FSA) catalyst.

The procedure for each of these examples (Table 1) is as follows: A dry baffled and jacketed glass reactor was equipped with a thermocouple, a fritted glass gas inlet for nitrogen and ethylene oxide, a solid carbon dioxide condenser with outlet, and a mechanical stirrer. The 3-MeTHF was charged to the flask as a 55% solution of 3-MeTHF in THF with additional THF to give the monomer loading as shown in Table 1 and cooled to 10–15° C. The flask was swept with nitrogen and fluorosulfonic acid was added dropwise over 3–5 min through a dry addition funnel. The reaction mass was then heated to the reaction temperature and ethylene oxide was added over about 3 h. Agitation to maintain a uniform temperature throughout the reaction mass was provided. The temperature of the increasingly viscous contents was allowed to rise to, but not to exceed, 45° C. Control of the ethylene oxide feed rate was used to moderate the temperature.

To terminate and neutralize the reaction, the carbon dioxide condenser was replaced by a simple distillation head and hot water (600 mL) was added. The flask contents were heated to 100° C. to remove a THF/water distillate. A nitrogen flow was maintained to speed the distillation. When the THF was stripped off, the stirring was stopped and the contents were allowed to separate. The water layer was removed, and the organic layer was then washed twice with two 600 mL batches of hot water. After the second wash, 15 g of calcium hydroxide was stirred in thoroughly, precipitating additional water, which was removed. Additional hydroxide was added in small portions until the pH was 7–8. The polymer mix was maintained at 80° C. to maintain low viscosity.

To isolate the polymer, the neutralized wet polymer was stripped under vacuum at 90° C. Solids were removed by filtration through a diatomaceous earth mat on a Whatman #1 filter paper on a steam-heated Buchner funnel. The haze-free polymer was weighed, the molecular weight determined by end group titration, and the composition determined by $^1$H NMR. These data are summarized in Table 2.

TABLE 1

| Ex. | THF (g) | EO (g) | 3-MeTHF (g) | FSA (g) | Rxn time (hr) | Rxn Temp (° C.) |
|---|---|---|---|---|---|---|
| 5 | 663 | 37.1 | 176 | 37.1 | 4.4 | 40 |
| 6 | 663.6 | 37.1 | 176.4 | 37 | 2.3 | 30.1–34.6 |
| 7 | 663.6 | 37 | 176.4 | 37.2 | 2.3 | 30.7–39.2 |
| 8 | 663.6 | 37 | 176.4 | 37.7 | 4 | 34.4–41.2 |
| 9 | 1448 | 81 | 385 | 80.8 | 4 | 35–40 |
| 10 | 1448 | 53.2 | 385 | 80.8 | 4 | 35 |
| 11 | 2949 | 204 | 647 | 141.4 | 4 | 35–41 |
| 12 | 2949 | 204 | 647 | 141.4 | 4.25 | 32–42 |
| 13 | 2768 | 204 | 792 | 75.1 | 4 | 25–32 |
| 14 | 2768 | 204 | 792 | 74.6 | 3.7 | 15–22 |
| 15 | 2768 | 204 | 792 | 75.9 | 4.5 | 10.5–31 |

Rxn in the table above means reaction.

TABLE 2

| Ex. | Conversion | % EO | % 3-MeTHF | Mn | Melt Point (° C.) |
|---|---|---|---|---|---|
| 5 | 56 | 4.8 | 9.5 | 1804 | 14.8 |
| 6 | 52.9 | 5.0 | 10.0 | 2166 | 7.79 |
| 7 | NA | 4.4 | 9.3 | 2244 | 9.89 |
| 8 | 63.9 | 5.4 | 9.6 | 1657 | 7.39 |
| 9 | 51.6 | 4.7 | 9.6 | 1778 | 16.15 |
| 10 | 51.1 | 2.9 | 9.3 | 1996 | 17.89 |
| 11 | 56.2 | 6.4 | 9 | 2274 | 17.18 |
| 12 | 50.6 | 7 | 9 | 2000 | 16.14 |
| 13 | 4.2 | 11.8 | 8.1 | 843 | 14.97 |
| 14 | 2.9 | 13.3 | 11.3 | 660 | 4.21 |
| 15 | 16.3 | 9 | 11.2 | 1085 | 11.05 |

Examples 16–20

These examples are provided to show copolymerization of THF, 3-Methyl-THF, and ethylene oxide using anhydrous phosphotungstic acid (PTA) catalyst.

A 5-L baffled jacketed reactor was equipped with a thermocouple, ethylene oxide and nitrogen inlet, a dry ice condenser with $N_2$ exit, and a mechanical stirrer. The equipment was dried at 100° C. with a $N_2$ sweep. The THF, water, and the anhydrous PTA were added to the flask and cooled (see Table 3). The 3-MeTHF was charged to the flask as a 55% solution of 3-MeTHF in THF with additional THF to give the monomer loading as shown in Table 3 and cooled to 10–15° C. The reactor was swept with nitrogen and the stirrer set for 250 rpm. The ethylene oxide was added steadily over a period of about 2 to 4 hours, with cooling to maintain the specified reaction temperature. After all of the ethylene oxide was added, stirring was continued until the total reaction time was completed. After the reaction period, 1 L of de-ionized water was added and the mixture stirred for at least 30 min. at 45° C.

The crude copolymer was purified by diluting the reaction mixture with an equal volume of methanol at 45° C., and passing the methanolic solution through a column packed with a weak-base ion exchange resin to absorb the acid catalyst. The unreacted THF, methanol, and water were the removed in vacuo. Solids were removed by filtration through a diatomaceous earth mat on a Whatman #1 filter paper on a steam-heated Buchner funnel. The haze-free polymer was weighed, the molecular weight determined by end group titration, and the composition determined by $^1$H NMR. These data are summarized in Table 4.

TABLE 3

| Ex. | THF (g) | EO (g) | 3-MeTHF (g) | PTA (g) | Rxn time (hr) | Rxn temp (° C.) | EO ADDN TIME (hr) |
|---|---|---|---|---|---|---|---|
| 16 | 2808 | 178 | 792 | 130 | 4.1 | −4–4 | 3.1 |
| 17 | 2808 | 178 | 792 | 75.6 | 4 | −4.4–1.5 | 2.9 |
| 18 | 2943 | 70.8 | 657.3 | 75.6 | 6 | −4.8–0.4 | 2.33 |
| 19 | 2943 | 123 | 657 | 75.6 | 5 | −1–3.6 | 3.83 |
| 20 | 2988 | 162 | 612 | 75.6 | 5 | 14–22 | 4.8 |

TABLE 4

| Ex. | Conversion | % EO | % 3-MeTHF | Mn | Melt Point (° C.) |
|---|---|---|---|---|---|
| 16 | 59 | 14.6 | 12 | 3420 | −0.37 |
| 17 | 53.6 | 14.45 | 12.9 | 4438 | −3.21 |
| 18 | 26.7 | 15.2 | 10.2 | 2233 | 4.46 |
| 19 | 46.6 | 13.9 | 10.35 | 2194 | 7.37 |
| 20 | 66.3 | 12.1 | 8.6 | 4180 | 10.02 |

Example 21

This example is provided to show copolymerization of THF, 2-methyl-THF, and ethylene oxide. A 250-ml round bottom polymerization reactor was set up, equipped with mechanical stirrer, dry ice reflux condenser with Drierite moisture protection tube, thermometer, and gas inlet tube. Tetrahydrofuran (THF, 25 g, 0.35 mol.), 2-methyl-THF (75 g, 0.75 mol.), and dry NAFION catalyst powder (grade NR-50, 6.5 g) were added. The mixture was heated to 60° C. with stirring, under a slow stream of nitrogen. When the system had reached 60° C., ethylene oxide gas (EO) was added slowly through the gas inlet tube at a rate of about 6 g per hour. EO addition was continued until a total of 17 g EO had been added. The EO feed was then shut off, and the gas inlet system flushed with nitrogen. Heating was continued for another 15 minutes, and then the polymerization vessel was allowed to cool to room temperature.

The polymer solution was separated from the solid catalyst by filtration, and any polymer attached to the catalyst was removed by washing with dry methanol. The polymer was isolated from the solution by vacuum drying for 1 hour at 100° C. and 1 mm of Hg (0.13 kPa) pressure. A final filtration gave 30 wt % of a clear polymer with a molecular weight determined by end group titration to be 2000, and the following composition:

25 wt % THF,
40 wt % 2-Methyl-THF, and
35 wt % of EO, as determined by NMR analysis.

What is claimed is:

1. A copolymer comprising constituent units derived by simultaneously polymerizing tetrahydrofuran, ethylene oxide and at least one additional cyclic ether, wherein the additional cyclic ether is represented by the structure

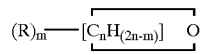

wherein
R is a C1 to C5 alkyl or substituted alkyl group,
n is an integer of value 4 or 6 to 9, and
m is zero or 1 except that when n=4, m is 1.

2. The copolymer of claim 1, wherein the additional cyclic ether is selected from the group consisting of: 3-methyl-tetrahydrofuran, 3-ethyl-tetrahydrofuran, 2-methyl-tetrahydrofuran, oxepane, oxocane, oxonane, and oxecane.

3. The copolymer of claim 2, wherein the additional cyclic ether is 3-methyl-tetrahydrotfuran.

4. The copolymer of claim 1, wherein the molar concentration of constituent units derived from ethylene oxide in the polymer is 1 percent to 60 percent based on the total weight of the copolymer.

5. The copolymer of claim 4, wherein the molar concentration of constituent units derived from ethylene oxide in the polymer is 1 percent to 30 percent based on the total weight of the copolymer.

6. The copolymer of claim 1, wherein the molar concentration of constituent units derived from the additional cyclic ether in the polymer is 1 percent to 40 percent based on the total weight of the copolymer.

7. The copolymer of claim 6, wherein the molar concentration of constituent units derived from the additional cyclic ether in the polymer is 1 percent to 20 percent based on the total weight of the copolymer.

8. A copolymer comprising constituent units derived by polymerizing tetrahydrofuran, ethylene oxide and at least one additional cyclic ether, wherein the additional cyclic ether is 3,4-dimethyl-tetrahydrofuran or perfluoroalkyl substituted oxirane.

* * * * *